April 2, 1968     M. R. JACKSON     3,376,064
HEAD AND NECK PROTECTOR
Filed Dec. 30, 1966     2 Sheets-Sheet 1
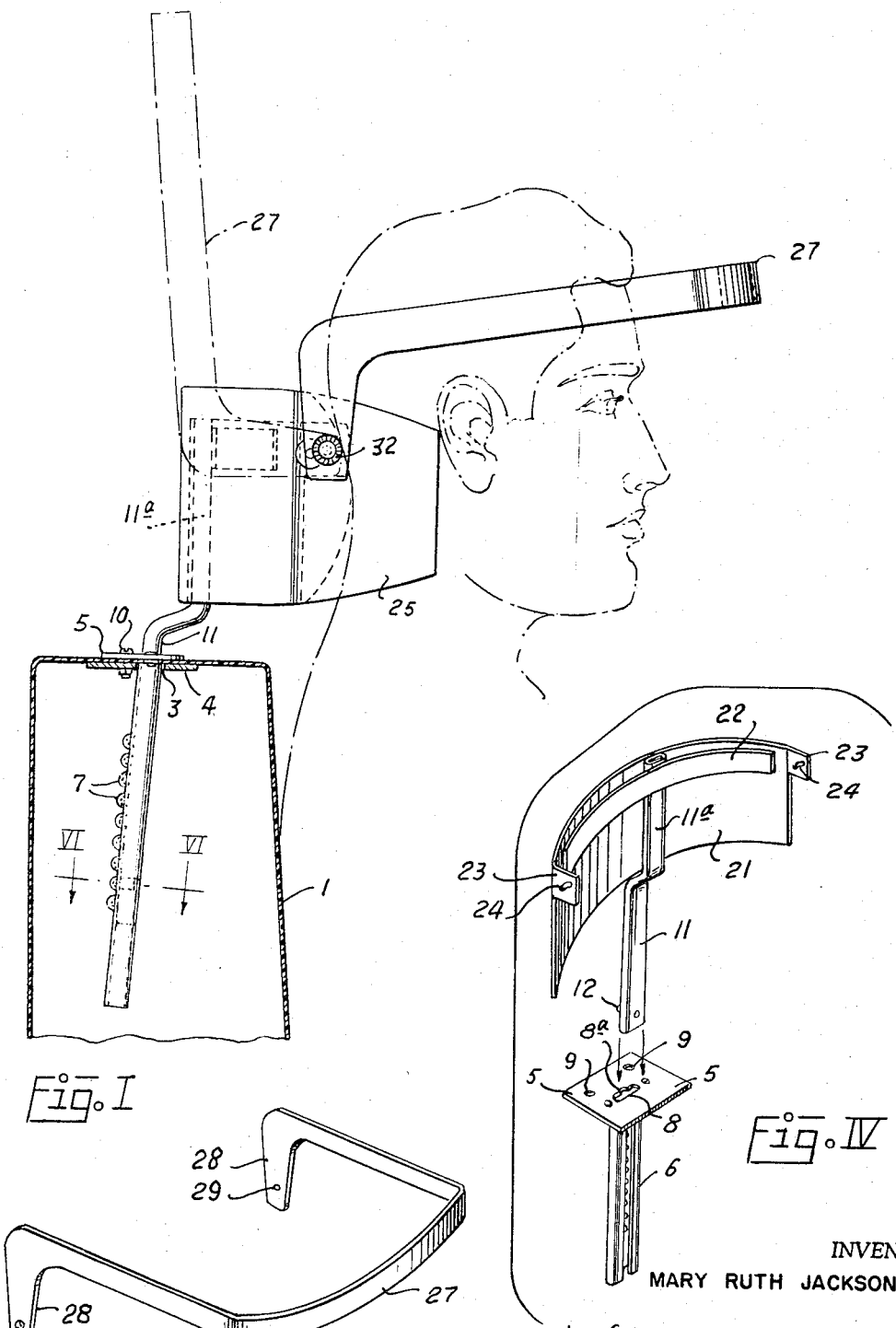
INVENTOR
MARY RUTH JACKSON
BY Howard E. Moore
ATTORNEY April 2, 1968  M. R. JACKSON  3,376,064
HEAD AND NECK PROTECTOR
Filed Dec. 30, 1966  2 Sheets-Sheet 2
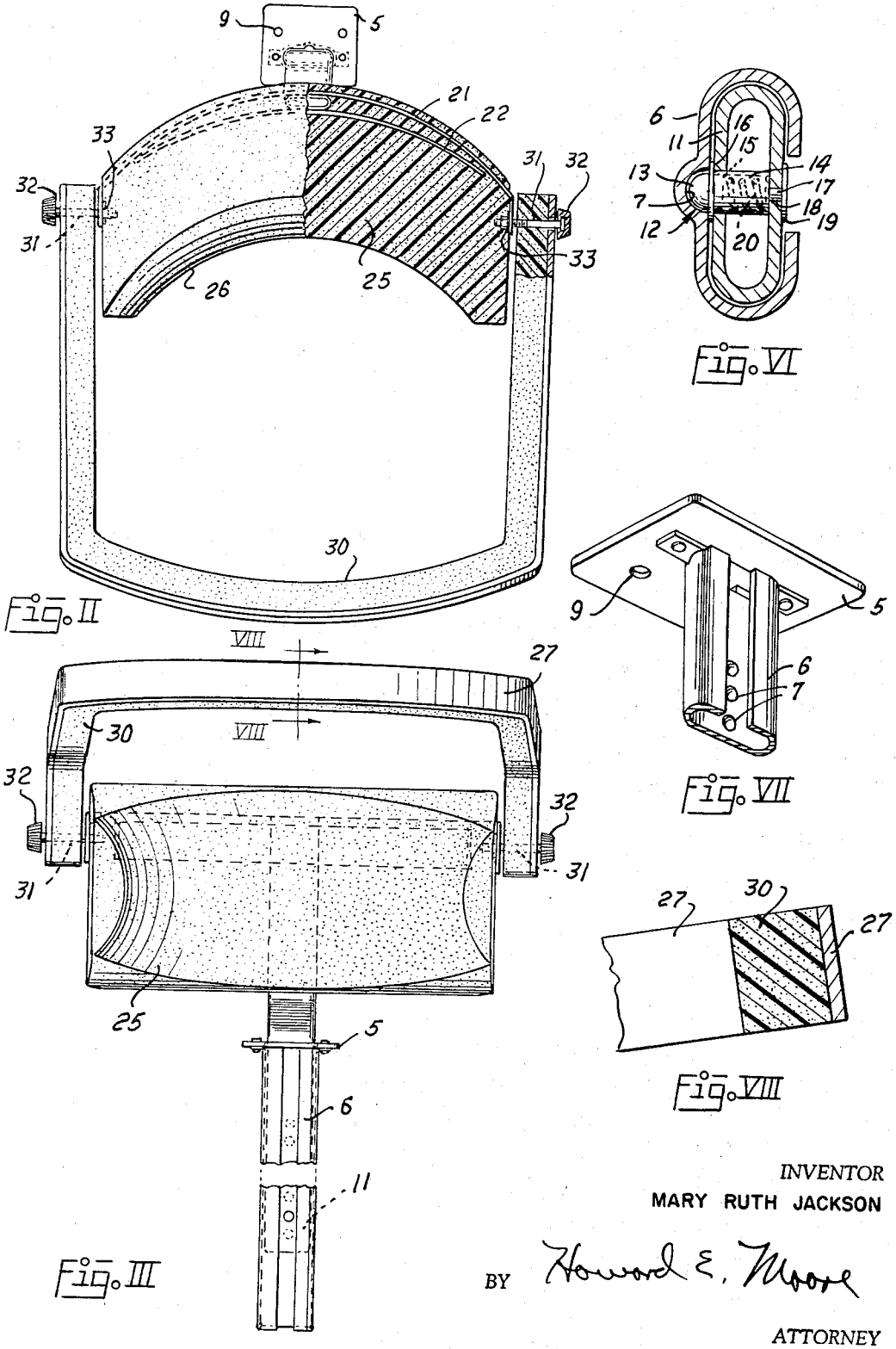
INVENTOR
MARY RUTH JACKSON
BY Howard E. Moore
ATTORNEY

United States Patent Office 3,376,064
Patented Apr. 2, 1968

3,376,064
HEAD AND NECK PROTECTOR
Mary Ruth Jackson, 3629 Fairmount St.,
Dallas, Tex. 75219
Filed Dec. 30, 1966, Ser. No. 606,249
7 Claims. (Cl. 297—391)

ABSTRACT OF THE DISCLOSURE

A head and neck protector to be mounted on the back rest of an automobile's seat including a head encircling member to limit unusual movement of the head in all directions but permitting normal movement of the head.

---

This invention is concerned with a device attachable to the back rest or other structure of a vehicle, such as an automobile, truck or aircraft, to protect the head and neck of the operator, or a passenger therein, from injury due to impact with surrounding rigid structural elements and from injury to muscles, soft tissues and nerves in the region of the neck and shoulders due to impact deceleration of the vehicle, and is particularly concerned with a device adjustably attachable to the back rest of the seat of an automobile having impact absorbing means arranged about the head of the occupant in such a manner as to limit all movements of the head and absorb impact blows caused by reason of rapid deceleration or acceleration of the vehicle in which the occupant is riding.

When a vehicle, such as an automobile, travelling at relatively high speed collides with another automobile or other exterior object, or is hit from the rear by a moving vehicle, the rapid deceleration or acceleration of the automobile causes the driver or the occupant to be thrown forwardly, sidewise or rearwardly, allowing his head to strike rigid frame elements, or other objects in the automobile, causing severe head injuries, or the head is thrown forwardly, laterally or backwardly with relation to the body, causing muscles, nerves and other tissues in the neck to be stretched, sprained and severely damaged resulting in prolonged pain and suffering and often permanent injuries.

With the increase of the automobile population, and the speed thereof, such types of injuries have become increasingly prevalent.

The relatively recent use of seat belts in automobiles has reduced injuries to the body as a whole to some extent, but have had no effect on the reduction of injuries to the neck, commonly referred to as "whiplash" injuries, due to the fact that the head is supported by the relatively small and flexible neck so that the head has a tendency to be thrown forward, backward, or to the side relative to the body upon the impact of the vehicle with an exterior object.

It is therefore a primary object of the invention to provide a device attachable to the back rest or other part of an automobile in a position to surround the head of the driver or other occupants with resilient restraining members to limit the movements of the head upon collision impact by the automobile or other vehicle.

A still further object of the invention is to provide such a head restraining device which is universally adjustable to accommodate different sizes of occupants of the vehicle.

Still another object of the invention is to provide a head movement restraining device mountable in a vehicle, such as an automobile, and positioned to limit all the movements of the head of the driver or other occupants, yet does not restrict the vision or freedom of movement of the occupant in such a manner as to constitute a driving hazard.

A still further object of the invention is the provision of a head movement limiting device adjustably attached to the back rest or other element in an automobile or other vehicle which is relatively simple in structure, economical in manufacture and assembly, and quickly and easily adjustable to accommodate different sizes and heights of users.

Other and further objects of the invention will become apparent upon reading the detailed specification hereinafter following and by referring to the drawings annexed hereto.

A suitable embodiment of the invention is shown in the attached drawings wherein, FIGURE I is a side elevational view of a head and neck protector device incorporating the invention hereinafter claimed, as it would appear when attached to a back rest of an automobile with the head restraining portion thereof extending about the head of the driver or other occupant of the automobile, FIGURE II is a top plan view of the head movement limiting device which is partially sectionalized to show the foam rubber structure of the padding material of the neck rest and head restraining device, FIGURE III is a front elevational view of the head restraining device, FIGURE IV is a front perspective view of the rear pad support plate with depending adjustment, rod and sleeve in which the rod is adjustably and telescopically inserted, FIGURE V is a top perspective view of the front support plate or strap to which head restraining resilient material is attached, FIGURE VI is a transverse sectional view taken on the line VI—VI of FIGURE I, FIGURE VII is a bottom perspective view of the mounting plate and adjustment sleeve assembly employed with the head restraining device, FIGURE VIII is a transverse sectional view taken along the line VIII—VIII of FIGURE III.

Numeral references are employed to indicate the various parts shown in the drawings and like numerals indicate like parts throughout the various figures of the drawings.

The numeral 1 indicates the back rest of an automobile or like vehicle with the body of the driver or other occupant 2 of the vehicle resting thereagainst.

A passage 3 is provided through the upper side of the back rest about which a reinforcing plate 4 is positioned and is attached by means of bolts 10 to a support plate 5 having a depending slotted sleeve 6 secured thereto. The plate 5 is disposed on the upper surface of the top of the back rest 1 and is secured to the reinforcing plate 4 by passing the bolts 10 through the bolt receiving holes 9, and through corresponding bolt receiving holes in the reinforcing plate 4.

A series of spaced rounded sockets 7 are provided along the wall of the depending sleeve 6 for the purpose hereinafter described.

A hole 8 is provided through the plate 5 which corresponds with, the hollow interior of the depending sleeves 6. The passage 3 also corresponds to the shape of the male insertion leg 11 on the support member assembly for the head restraining portions of the device.

A spring urged friction catch, indicated generally at 12, is carried by the leg 11. The head 13 of the friction catch is arranged to pass through the slots 8a provided in the edge of the hole 8.

The spring urged friction catch is shown in detail in FIGURE VI, and includes a rounded nose 13 which generally corresponds to the shape of the sockets 7, and is arranged to enter thereinto for vertical adjustment of the head restraining assembly, as hereinafter described. A hollow sleeve 14 extends through a passage 15 provided through the wall of the leg 11 and has a flange 16 on the outer end thereof to limit inward movement thereof. The other end of said sleeve 14 is positioned against the opposite wall of the leg 11. The nose 13 is slidably disposed in the hollow sleeve and has extending therefrom a pin 17 which movably extends through a hole 18 in the wall of the leg 11. A flange 19 is secured to the outer end of the pin 17 to limit the inward movement of the pin 17 and the nose 13 with relation to the leg 11.

A spring 20 is disposed within the sleeve 14, about the pin 17, and the ends of the spring 20 contact the inner end of the nose 13 and the inner end of the sleeve 14 to retain the spring 20 in the sleeve 14.

It will be seen that nose 13 may move inwardly of the sleeve 14 against the spring 20 and when the nose 13 coincides with one of the sockets 7 the spring 20 will urge the nose 13 into the socket to resiliently retain same therein. However, upon a predetermined upward or downward force being applied against the leg 11 the nose 13 will be caused to retract against the spring 20 to allow it to move to another socket 7. Thereby the height of the head restraining assembly of the device may be adjusted.

An arcuately shaped plate 21 is secured to the offset portion 11a of the leg 11 and is reinforced by a reinforcing strap 22 which may be secured thereto by spot welding.

Forwardly turned ears 23 are provided on the plate 21, said ears having curved, elongated, adjustment passages 24 therethrough.

Resilient padding material 26, such as foam rubber (as shown), or other suitable resilient material is secured to the support plate 21, either by molding same thereto, or by other suitable attachment means such as screws, with the ears 23 exposed on the outer sides thereof with the passages 24 therein arranged to receive screws 31 as hereinafter described.

The resilient padding material 25 preferably has a curved inner surface 26 thereon arranged to engage the back of the neck and head of the driver or other occupant of the vehicle.

A strap 27 which may be made of metal or other rigid material (FIGURE V) includes depending ears 28 thereon having screw receiving holes 29 therethrough.

Resilient padding material, such as foam rubber, felt of other resilient material is secured to the inner side of the support strap 27 in a position so that it will be in position to engage the front and sides of the driver or other occupant's head when positioned therearound.

Threaded screws 31 has knurled heads 32 on the outer ends thereof and extends through the holes 29 in the ears 28 and the aligned slots 24 in the ears 23, and has speed nuts 33 threadedly disposed on the inner ends thereof. Speed nuts 33 are imbedded in the padded material 25, so that by rotation of the screws 31 the engagement between front strap 27 and the ears 23 may be tightened or loosened to allow vertical and rearward adjustment of the head strap member 27. For instance the screws 31 may be unscrewed from the speed nuts 33 and moved outwardly to allow the front strap 27 to be adjusted vertically and rearwardly to the extent of the length of the arcuate slots 24, and the screws 31 may be rotated inwardly by threaded co-action with the speed nuts 33 to cause same to frictionally engage the ends of the paddling material 26 to thereby fix the front strap 27 in adjusted position, as shown in FIGURE I.

The operation and function of the device hereinbefore described is as follows:

The head restraining assembly of the device may be adjusted vertically to accommodate the height of the occupant 2 by moving the leg 11 upwardly or downwardly telescopically within the sleeve 6, as the spring urged nose member 13 moves between the sockets 7, as hereinbefore described. The interior of the front head restraining member 27 is positioned about the head of the occupant. The front restraining member 27 may then be adjusted vertically, and to a limited extent rearwardly as shown in FIGURE I, the screws 31 may be tightened down to fix same in adjusted position, as hereinbefore described.

It will be noted that the padded restraining member 27 encircles the head of the occupant at the front and on each side and is in such position as to not obstruct the view of the driver. It is spaced from the sides and front of the head sufficiently to allow freedom of movement, yet restrains forward, backward, and lateral movement of the head to prevent the head from coming into contact with the interior of the automobile and limits all movements of the head to such an extent as to prevent "whiplash" damage to nerves and tissues in the neck in the event of a collision. The rear pad 25 is spaced from, but arranged to engage, the back of the neck of the driver or other occupant to limit rearward movement of the head to such an extent as to prevent "whiplash" injury to the neck.

The entire device may be quickly and easily mounted on, or demounted from, the back rest, or other mounting base, and may be disassembled or folded in compact position for storage or carrying. The device may be quickly and easily mounted on presently existing automobiles or other vehicles, and when not in use, or before applying same about the head of the occupant the front portion 27 may be swung upwardly to the position shown in broken lines in FIGURE I, out of the way of the driver or other occupant while he is getting in the vehicle and may be quickly swung forwardly about the head of the occupant and adjusted in the desired protective position.

It will be seen that I have provided a head and neck restraining device mountable in an automobile or other vehicle in position to limit and restrain the forward, backward and lateral movement of the head of the occupant to such an extent as to prevent impact and neck sprain injuries in the event of a collision between the vehicle and an outside object. The device is simple in construction, economical to manufacture, quickly adjustable, does not obstruct the view or impair the necessary movement of the driver of the vehicle and may be quickly and easily mounted on, and demounted from, presently existing automobiles or other vehicles.

It will be understood that other and further embodiments of my invention may be made without departing from the spirit and scope of the appended claims.

Having described my invention I claim:

1. In a device of the class described, a first hollow support member; a second support member telescopically and adjustably extending into the first support member; means to disengageably attach the first and second support members against relative telescopic movement; a transversely disposed head movement limiting member carried by the upper end of the second support member; resilient padding material on the inner side of the head movement limiting member; a rigid U-shaped head encircling member pivotally attached to the head limiting member, said head encircling member being spaced from the head to allow normal movement thereof but restraining same from unusual lateral and forward movement thereof; resilient padding material attached to the inner side of the head encircling member; means to disengageably secure the head limiting member and head encircling member against relative vertical pivotal movement.

2. The combination called for in claim 1 wherein the disengageable attachment means between the first and second suport members comprises a series of sockets in the wall of the first support member, and a spring urged head carried by the second support member arranged to successively enter the sockets as it is moved upwardly or downwardly with relation thereto.

3. The combination called for in claim 1 wherein the means to disengageably secure the head limiting member and the head encircling member together comprises screws extending through said members and a speed nut on the inner of each screw.

4. The combination called for in claim 3 wherein the screws pass through elongated arcuate slots in the head encircling member.

5. The combination called for in claim 1 wherein the padding material on the head limiting member and the head encircling member is foam rubber integrally molded thereto.

6. The combination called for in claim 1 with the addition of an attachment member on the first support member on the first support member arranged for attachment of same to the back rest of an automobile seat.

7. In combination with the back rest on the seat of an automobile, an elongated hollow member; means to attach the hollow member to the back rest; a support member telescopically arranged in the hollow member; means to disengageably secure the hollow member to the support member against relative telescopic movement; a first padded member secured to the uper end of the support member in position to engage the back of the head and neck of an occupant of the automobile seated in the seat thereof; a second padded member pivotally secured to the first padded member arranged to be pivoted verticly about the head of the occupant, the second padded member being spaced from the head so as to allow normal movement thereof, but restraining same from unusual lateral and forward movement thereof; and disengageable securing means to secure the padded members against relative vertical pivotal movement.

References Cited
UNITED STATES PATENTS

| | | | |
|---|---|---|---|
| 2,638,293 | 5/1953 | Lindstrom | 297—393 X |
| 3,027,194 | 3/1962 | Rumptz | 297—410 |
| 3,063,751 | 11/1962 | Hatch | 297—410 |
| 3,170,659 | 2/1965 | Wood | 297—391 X |

CASMIR A. NUNBERG, *Primary Examiner.*
BOBBY R. GAY, *Examiner.*

UNITED STATES PATENT OFFICE
CERTIFICATE OF CORRECTION

Patent No. 3,376,064                      April 2, 1968

Mary Ruth Jackson

It is certified that error appears in the above identified patent and that said Letters Patent are hereby corrected as shown below:

Column 5, line 4, "inner" should read -- inner end --; line 14, cancel "on the first support member".

Signed and sealed this 29th day of July 1969.

(SEAL)
Attest:

Edward M. Fletcher, Jr.                      WILLIAM E. SCHUYLER, JR.
Attesting Officer                             Commissioner of Patents